UNITED STATES PATENT OFFICE.

ERICH KARL MATHIAS HOLST, OF ALTONA, GERMANY, ASSIGNOR TO JOHANN HEINRICH ARTHUR SCHAAR, OF HAMBURG, GERMANY.

ELASTIC COMPOSITION.

No. 928,053.   Specification of Letters Patent.   Patented July 13, 1909.

Application filed November 27, 1908. Serial No. 464,649.

*To all whom it may concern:*

Be it known that I, ERICH KARL MATHIAS HOLST, a subject of the German Emperor, and resident of Altona, in the German Empire, have invented a certain new and useful Improved Elastic Composition, of which the following is a specification.

This invention relates to the production or manufacture of an elastic composition and consists substantially in dissolving one or more suitable colloids in glycerin, and adding salicylic acid, tannin, lysoform and hexamethylene-tetramin to the solution. Lysoform is a mixture of about equal parts of formaldehyde and soap solution.

The improved composition is more particularly designed for use as a resilient filling for the tires of motor vehicle wheels, and cycle wheels, and for cushions and the like. It can also be employed with advantage as an insulator for electricity, heat and cold.

The process of manufacture of the improved composition and the proportions of its constituents may be varied but a composition giving very satisfactory results may be produced by employing the proportions and compounding the constituents as stated in the following example:—1 part by weight of a suitable colloid of animal or vegetable origin such as Japan glue, known as "tjentjan", is dissolved in about 2 to 6 parts by weight of glycerin with heat. To this semifluid mass are added about 2 to 3 per cent. of salicylic acid and about 1 to 2 per cent. of tannin. To the resulting mixture which may be called the "basic material", there are added (preferably just before use, for instance before charging into the hollow tire of a motor vehicle wheel) after the basic material has been heated to from 70 to 80 degrees centigrade, from 2 to 12 per cent. of lysoform and from ¼ to ½ per cent. of hexamethylene-tetramin. The whole is then thoroughly mixed together, whereupon it is ready for use, that is to say for charging into the hollow tire or the like. On cooling, the resulting composition is an elastic substance resembling gelatin; it is very soft and its elasticity is permanent, that is to say, the composition yields to all pressure but always resumes its original shape after the pressure is removed.

Various processes and materials have been proposed for the manufacture of elastic compositions for filling hollow tires and the like, such compositions have been composed mainly of a gelatinous substance such as glue or glycerin, with a hardening agent such as potassium bichromate. A composition of that kind when freshly made, has a texture or quality somewhat similar to caoutchouc, but is not suitable for use as a substitute for air in the tires of motor vehicles &c., because it is too hard for smooth running. After a certain time such a composition becomes brittle and crumbling, so that it is very soon disintegrated to powder when used under heavy or fast moving vehicles. Its elasticity and load-carrying capacity are then of course destroyed.

Attempts to improve the above mentioned chromated gelatinous compositions by the addition of rasped caoutchouc, have been unsuccessful, because since caoutchouc is not soluble in glycerin and water, it can only enter in mechanical admixture with the composition. It has also been proposed to replace the potassium bichromate by an equal quantity of tannin. Such a large quantity of tannin however hardens gelatinous substances, and therefore diminishes the elasticity of the composition. A further drawback is that such a mixture of gelatinous substance, glycerin, water and tannin, has a much too low melting point to be suitable for use as a filling for the hollow tires of motor vehicles. The addition of salicylic acid to a composition of that kind has always been proposed solely for antiseptic purposes. Further, a mixture of formalin glue with glycerin as already proposed has the same drawbacks as the above mentioned chromated gelatinous compositions. Formaldehyde has a hardening action on glue and gelatin so that the mixture very soon crumbles and loses its elasticity. When used as a filling for the tires of motor vehicles, the mixture is at first very hard to run on, and afterward becomes reduced to powder. In consequence of the loss of formaldehyde, a slight increase in temperature such as that produced by the friction of the tire tubes or covers, causes the mixture to melt and become useless.

Compositions composed of formalin-gelatin without an addition of glycerin are quite useless for the purposes in view because such compositions will begin to freeze at 0 degrees centigrade.

Now a composition manufactured according to the present invention is a real gelatin, of such softness and elasticity that it will react to any pressure and will resume immediately its original shape when relieved of pressure. Notwithstanding its softness the consistency of the composition is such that it is not melted by the rise in temperature due to friction in use, and it retains this property of infusibility combined with great softness constantly without acquiring the hardness which would render the composition brittle and crumbling. This constancy of softness and elasticity is due to the absence of the chromates, to the presence or use of a not too large quantity of tannin, and to the presence or use of a sufficient amount of salicylic acid which acts to decompose slowly the lysoform, and more especially the hexamethylenetetramin and thereby maintains constant the elasticity and infusibility of the gelatinous material which would otherwise diminish. Moreover the salicylic acid has the property of keeping the gelatin treated therewith permanently soft and of preventing wholly or to a great extent the same from becoming hard and brittle. Whereas the compositions known hitherto composed of gelatinous substances (glue) glycerin, and other materials hereinbefore mentioned, constitute a rather hard mass resembling caoutchouc, the improved composition produced according to the present invention is a highly elastic soft substance similar to gelatin and retains its softness and elasticity permanently.

The improved composition when freshly made is so fluid in heat that it can be forced with any desired pressure into any mold or flexible tube according to requirement, and it becomes soon so resistant that it will not be melted by heating within the limits of ordinary use and will not become hard. This very important property is due to the fact that before the composition is charged into the tire, only a fraction of the lysoform and of the hexamethylenetetramin comes into action—just sufficient to produce the requisite elasticity and infusibility, which conditions are maintained by the action of the acid, due to the heat produced by the use of the filled tire. The permanent softness is due more especially to the salicylic acid.

The improved composition is suitable for use as a substitute for a filling of compressed air, whereas all hard compositions resembling caoutchouc, give hard running tires like solid tires and are useless.

I claim:

1. The herein-described improved elastic composition of matter consisting of a colloid, glycerin, salicylic acid, tannin, lysoform and hexamethylene-tetramin, substantially in the proportions as described and for the purpose specified.

2. The herein described composition of matter consisting of one part by weight of Japan glue (tjen-tjan,) two to six parts by weight of heated glycerin, two to three per cent. of salicylic acid, one to two per cent. of tannin, two to twelve per cent. of lysoform and from one fourth to one half per cent. of hexamethylenetetramin, substantially as described.

ERICH KARL MATHIAS HOLST.

Witnesses:
MAX F. A. KAEMPFF,
ERNEST H. L. MUMMENHOFF.